United States Patent [19]

Morton

[11] Patent Number: 4,975,918
[45] Date of Patent: Dec. 4, 1990

[54] TUNABLE LASER

[75] Inventor: Richard G. Morton, San Diego, Calif.

[73] Assignee: Maxwell Laboratories, Inc., San Diego, Calif.

[21] Appl. No.: 362,575

[22] Filed: Jun. 7, 1989

[51] Int. Cl.$^5$ ............................................... H01S 3/10
[52] U.S. Cl. ............................................ 372/20; 372/37
[58] Field of Search .................................... 372/20, 37

[56] References Cited

U.S. PATENT DOCUMENTS

| | | | |
|---|---|---|---|
| 3,480,877 | 11/1969 | Dillon | 331/94.5 |
| 3,824,492 | 7/1974 | Brienza et al. | 331/94.5 |
| 3,928,814 | 12/1975 | Feichtner | 372/10 |
| 3,963,995 | 6/1976 | Jacob | 331/94.5 C |
| 4,023,117 | 5/1977 | Schada | 372/37 |
| 4,035,741 | 7/1977 | Crisp et al. | 372/37 |
| 4,264,877 | 4/1981 | Grischkowsky et al. | 331/94.5 G |
| 4,462,103 | 7/1984 | Salour et al. | 372/35 |
| 4,637,027 | 1/1987 | Shirasaki et al. | 372/37 |

Primary Examiner—William L. Sikes
Assistant Examiner—Robert E. Wise
Attorney, Agent, or Firm—Fitch, Even, Tabin & Flannery

[57] ABSTRACT

A tunable laser includes a laser medium (24), a resonant cavity (27, 28), at least one Faraday rotation element (26), and a polarization sensitive attenuator (25). Waves of laser energy produced by the laser medium resonate in the resonant cavity between a 100% reflective surface (27) and a partially transmitting mirror surface (28). The waves pass through the attenuator (25) and are linearly polarized. The linearly polarized waves pass through the Faraday rotation element (26) and the polarization sensitive attenuator (25) on each pass through the resonant cavity. The Faraday rotation element includes a permanent magnet (54) and a trim coil (56) for generating both fixed and variable components of a magnetic field. The polarized wave is rotated by an amount proportional to the intensity of the total magnetic field and the wavelength of the polarized wave. The polarization sensitive attenuator allows only waves of a prescribed polarization angle to pass therethrough without attenuation. Only unattenuated waves continue to resonate within the resonant cavity. In one embodiment, the Faraday rotation element and the laser medium are combined in a single element. The laser is tuned by varying the current applied to the trim coil, thereby adjusting the amount of rotation imparted to the polarized wave, which amount of rotation determines the particular wavelength that is allowed to resonate within the resonant cavity without attenuation.

28 Claims, 6 Drawing Sheets

TUNABLE LASER

BACKGROUND OF THE INVENTION

The present invention relates to lasers, and more particularly to an electromagnetically tunable broadband laser having no moving mechanical parts.

The laser is a device that generates coherent electromagnetic radiation in, or near, the visible part of the spectrum. The term "laser" refers to Light Amplification by Stimulated Emission of Radiation. In very simple terms, a laser operates by applying energy to a suitable material, termed the "laser medium", such as a ruby rod or semiconductor. This energy pumps electrons in the material to higher energy states. These "pumped up" electrons then fall back to a lower energy state while emitting rays of light (photons). The emitted rays of light are controlled, for example in an oscillating reflective resonant cavity, and a portion of the amplified light is extracted as the laser output of the device.

Lasers are used in a wide variety of different applications. Low-power lasers are employed, for example, in short-range visible-light communication systems. Such communication systems are made possible because the laser light can be readily modulated, and it suffers far less angular divergence than ordinary light. Lasers may also be used for such diverse purposes as measurement of distances, measurement of velocities, and medical surgery. High-power lasers are used for heating and welding, and they are also used in weaponry systems.

Lasers generally operate in one of two modes: (1) a single frequency, narrow-band mode, or (2) a multifrequency broad-band mode. The mode of operation is determined by the type of laser medium used and the geometry of the resonating cavity. Where the cavity mode is narrow band, the laser emits laser light or photons having a single frequency. Due to doppler shift and other causes, this single frequency laser energy creates a very narrow band of frequencies at a receiving site. Often, the spectrum of such narrow band laser comprises three main frequency components, having wavelengths that may differ by only a fraction of an angstrom. Narrow band cavity mode lasers are useful in communication systems, and are exemplified by the HeNe laser. The present invention is not intended for use with such narrow band cavity mode operation.

In multifrequency broad-band operation, on the other hand, the laser emits a broad spectrum of laser frequencies within a gain band, having wavelengths that may vary over a wide range, such as 100 angstroms. Representative laser mediums that produce a broad band of laser frequencies include titanium doped sapphire or an organic dye. Broad band mode operation offers significant advantages over narrow band mode operation for many applications. For example, the laser mediums used with broad band operation are typically less expensive or may require less excitation energy than do narrow band laser mediums.

For many applications involving broad band mode operation, it is desireable to select a particular frequency (or narrow band of frequencies) from the broad band of frequencies available in the laser spectrum. (Note that it is also common to refer to the wavelength of the laser rather than the frequency of the laser, although one is directly relatable to the other in a given environment.) Such frequency or wavelength selection is referred to as "tuning" the laser. Many laser applications require that the laser be tuned rapidly, or switched from a first frequency (or first narrow band of frequencies) to a second frequency (or second narrow band of frequencies) in a very short time period.

Heretofore, the only techniques known for tuning a laser operating in the broad band mode of operation have involved mechanical devices that physically move or rotate an optical component, such as a grating or prism, relative to the optical axis of the resonant cavity. Disadvantageously, all such components have a certain inertial mass associated therewith that limits how fast they can be rotated or moved. Further, special drive mechanisms, such as motors, solenoids, galvanometers, and the like, are required to effectuate the movement of such components. These drive mechanisms all significantly add to the cost and complexity of the laser system, and further require constant maintenance and repair.

An alternative to tuning a single broad band laser in order to switch from one laser frequency to another is to switchably select the desired laser output from one of a plurality of narrow band cavity mode lasers. Disadvantageously, such a selection system not only requires multiple laser sources, each having its own resonating cavity, but also requires the optical switching components required for selecting the laser from one source and deselecting the laser from the other sources. These additional components further add to the complexity and cost of the system. Moreover, many of the selection components further involve moving mechanical elements, all of which further limit the speed with which the switching function can performed.

It is thus evident that there exists a need for a simple means of rapidly tuning a laser system that involves no moving mechanical components. It would also be desireable if such a tunable laser system utilized as few components as possible, i.e., if the selection could be performed by rapidly tuning a single broad band laser rather than switching between the output beams of a plurality of narrow band lasers. The present invention advantageously addresses these and other needs.

SUMMARY OF THE INVENTION

The present invention provides a simple wavelength-tunable laser system wherein wavelength tuning is achieved electromagnetically through selective Faraday rotation of a linearly polarized laser beam. Advantageously, the system involves a single laser source operating in the broad band cavity mode. Thus the system involves few components. Tuning the system involves no moving mechanical parts, but only the generation of a controllable magnetic field. Hence, the system allows the laser wavelength to be tuned in a rapid and accurate manner, and maintenance and repair of the system is significantly minimized.

The tunable laser of the present invention includes five basic components: (1) a laser medium, including means for exciting the laser medium with sufficient energy to produce a wave of laser energy; (2) means for linearly polarizing the wave of laser energy; (3) a resonant cavity wherein the wave of polarized laser energy resonates between specified points, such as between at least one 100% reflective surface in optical alignment with at least one partially transmitting mirror surface; (4) at least one adjustable Faraday rotation device within said resonant cavity that is optically aligned to have the resonating wave pass therethrough, this rotation device causing the angle of polarization of the polarized wave passing therethrough to be rotated by an amount proportional to its wavelength and a controllable parameter; and (5) a polarization sensitive attenuator also within the resonant cavity that allows only linearly polarized waves of a prescribed polarization angle to pass therethrough without attenuation. In one embodiment, the means for linearly polarizing the wave of laser energy may also be the polarization sensitive attenuator. In such an embodiment, the invention is thus reduced to four basic components, one of which performs a dual function.

In operation, the waves of laser energy are linearly polarized and optically resonate in the resonant cavity, e.g., between the 100% reflective surface and the partially transmitting mirror surface. Waves reflecting between these surfaces pass through the Faraday rotation device and the polarization sensitive attenuator on each pass through the resonant cavity. Only waves not attenuated by the polarization sensitive attenuator continue to resonate within the cavity. A portion of these waves pass through the partially transmitting mirror surface and are available as the output wave or laser energy of the system. The wavelength (frequency) of such unattenuated waves is determined by the amount of rotation imparted to the resonating polarized waves by the Faraday rotation element. Hence, by selectively adjusting the amount of rotation imparted to the resonating polarized waves to match that allowed to pass through the polarization sensitive attenuator, the wavelength of the laser waves available at the output of the system can be selected.

In the preferred embodiment, the Faraday rotation device includes a permanent magnet and a trim coil in a suitable configuration for generating both fixed and variable components of a magnetic field, this magnetic field being oriented to create lines of magnetic force substantially parallel to the optical axis of the resonant cavity. As the plane polarized waves pass through this device, the polarization angle of the wave is rotated by an amount proportional to the total magnetic field generated by the Faraday rotation device and the wavelength of the polarized wave. Adjusting the variable component of the magnetic field by adjusting the current flowing through the trim coil thus provides a convenient control parameter for selecting the amount of rotation imparted to the plane polarized wave.

In one embodiment, the Faraday rotation device and the laser medium are combined in a single element. Such combination advantageously simplifies the construction of the laser system, resulting in even fewer components and less expense.

In a further embodiment, the frequency (wavelength) of the output laser wave is monitored and compared to one or more reference values. An error signal is generated based upon the difference between the monitored value and the reference value(s). This error signal controls the amplitude of the current applied to the trim coil, and hence controls the amount of rotation imparted to the linearly polarized wave, using conventional negative feedback to minimize the error signal. In this manner, the frequency (wavelength) of the output wave is maintained precisely at the desired value(s). Moreover, where the reference value(s) are switched between a plurality of possible reference value(s), the wavelength of the laser output is advantageously switched between a corresponding plurality of different values at a rapid rate.

The present invention further includes a method of tuning a laser system having an appropriate laser medium and cavity for operation in the broad band mode. This method includes exciting the laser medium with an appropriate energy so as to generate a wave of laser light, linearly polarizing the wave of laser light, reflecting the linearly polarized wave within the resonant cavity so that it resonates therein, and adjusting the amount of rotation imparted to the polarized wave on each pass through the resonant cavity so that only waves having a desired frequency continue to resonate without attenuation. The rotation of the polarized wave may be accomplished using a Faraday rotation element. This element may include a permanent magnet and a trim coil as described above. If so, the adjusting of the amount of rotation is accomplished by simply varying the current applied to the trim coil.

It is one aspect of the present invention to provide a laser system operating in the broad band mode wherein the frequency or wavelength of the output laser beam can be rapidly tuned to a desired value using electromagnetic means involving no moving mechanical parts.

It is still another aspect of the invention to provide such a tunable laser wherein the output frequency or wavelength can be rapidly switched between a plurality of desired discrete frequencies or wavelengths within the gain band of the laser medium.

It is yet another aspect of the invention to provide a tunable laser that does not require precision mechanical tuning components, thereby avoiding problems with mechanical inertia and wear.

It is a further aspect of the present invention to provide a laser system wherein the frequency of the output laser energy may be selectively maintained at a prescribed value, or may be controllably switched between a plurality of prescribed values, despite variations in input power or component performance.

It is still yet another aspect of the present invention to provide a method of tuning a broad band laser system that allows the system to be quickly tuned to a desired frequency or wavelength without involving the use of any moving mechanical parts.

BRIEF DESCRIPTION OF THE DRAWINGS

The above and other aspects, features and advantages of the present invention will be more apparent from the following more particular description thereof, presented in conjunction with the following drawings wherein:

FIG. 3 is an optical schematic diagram of another embodiment of a tunable laser in accordance with the present invention wherein a laser medium and Faraday rotator device are combined in a single element;

DETAILED DESCRIPTION

Figure 1:
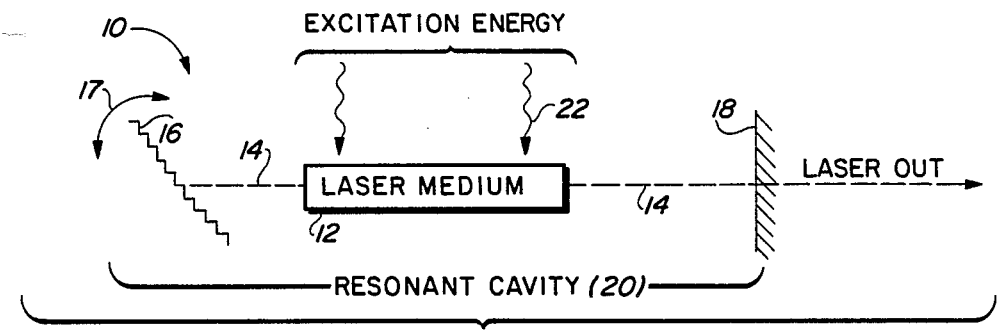
FIG. 1 is prior art schematic diagram of a simple solid state laser.

The following description is of the best presently contemplated mode of carrying out the invention. This description is not to be taken in a limiting sense, but is made merely for the purpose of describing the general principles of the invention.

Laser theory and the manner of operating lasers is well known and documented in the art. See, e.g., Siegman, A. E., *Lasers* (University Science Books, 1986). Accordingly, a detailed, rigorous description of laser theory and operation will not be repeated herein. Nonetheless, as an aid to better understand the present invention, and to better appreciate the advantages offered by the invention over prior art laser systems, a simplified description of a laser operating in the broad band mode will first be presented. For this purpose, reference is made to FIG. 1 where there is shown a simplified schematic diagram of one particular prior art laser system 10. The laser system 10 includes a suitable tunable broadband laser medium 12, such as titanium doped sapphire, or an organic dye, having an optical axis 14. The optical axis 14 is aligned with a diffraction grating 16 of very high reflectivity and an output mirror 18, having a partially reflecting surface. The laser medium 12 in combination with the optic elements 16 and 18 comprise a resonant cavity 20. As is explained more fully below, it is within the optical cavity 20 that the laser energy (e.g., a laser beam) oscillates or resonates between the respective surfaces of the mirrors 16 and 18.

In operation, energy from an external energy source is directed to the laser medium 12 to start and maintain the lasing action. This externally applied excitation energy is symbolically represented in FIG. 1 as a wavy arrow 22. In practice, this external energy may take the form of photons, as obtained from a external photon source (e.g., such as a flashlamp), or of an electrical current that flows across a P-N junction of the laser medium. The external energy is absorbed by some of the electrons within the atoms of the laser medium 12, causing them to move to a higher energy state. When the electron drops back to its original energy state, a radiative transition takes place, and a photon is emitted. (The process of increasing the energy of the electrons from one state to another is sometimes referred to as "pumping up" the electron. Correspondingly, where the source of external energy is itself a light source, it is sometimes referred to as a "pump light" or "pump laser.") When an electron drops from a higher energy state to a lower energy state, there is a time constant involved for the decay (dropping) process. Where this process results in random emission of radiation it is called spontaneous emission. A single transition causes an additional transition to take place in such a way that the two emissions are additive. This in turn induces more transitions, resulting in the emission of an amplified version of the first photon emission. This form of amplified emission is referred to as stimulated emission. Where the emitted photons are made to travel again through the region where stimulated emission first occurred, the amplification continues until the gain balances the losses and a sustained output of photon emissions results. This sustained photon output is coherent in time and space (i.e., it is in-phase) and is referred to as a laser (light amplification by stimulated emission of radiation) beam, laser wave, or laser energy. Because the laser beam is coherent in time and space, it provides significant advantages not available with incoherent (out-of-phase) photon energy.

Still referring to FIG. 1, it is thus seen that the external energy 22 pumps up the electrons in the laser medium 12, causing photons to be emitted as described above. By properly configuring the geometry of the laser medium 12, in a manner as is well known in the art, these emitted photons are directed along the optical axis 14. In so doing, the photons reflect, for example, from the surface of the grating 16 back through the laser medium 12 to the output mirror 18, and then reflect from the mirror 18 back through the laser medium 12 to the grating 16, thereby oscillating within the resonant cavity 20. Each time the photons pass through the laser medium 12, the lasing action (amplification of the photon emission) is reinforced. A portion of the photons are transmitted through the output mirror 18, and these photons comprise the laser energy or laser beam that is output from the laser system 10.

The wavelength of the laser beam that resonates within the cavity 20 may be controlled by rotating the diffraction grating 16. That is, as is well known in the art, the diffraction grating 16, or equivalent device (such as a prism), reflects (or transmits) optical energy incident thereto at an angle that varies as a function of wavelength. Thus, for example, only one particular wavelength will be reflected back along (convergent with) the optical axis 14, while other wavelengths will be reflected in directions away from (divergent) the optical axis 14, for a given orientation of the grating relative to the incident optical energy. Hence, tuning of the laser system 10 can be accomplished by selectively rotating the grating 16, as indicated by the arrows 17, so that only the desired wavelength resonates within the cavity 20. Unfortunately, rotating the grating 16 from one position to another can only, and stabilizing it once it has been so moved, can only be accomplished in a finite time, typically on the order of seconds. Further, such motion requires not only some form of electromechanical transducer to convert an appropriate control signal to the desired mechanical (rotational) motion, but also requires a drive circuit for generating the control signal. All of these constraints disadvantageously limit how such a system can be used.

Figure 2A:
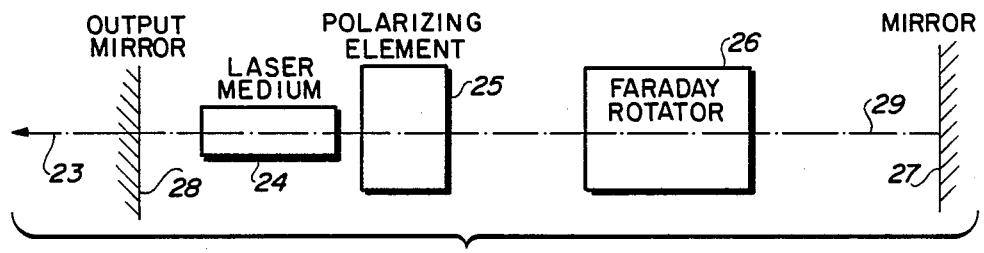
FIG. 2A is a block diagram of the tunable laser of the present invention.

Referring next to FIG. 2A, a block diagram of the tunable laser of the present invention is shown. The system includes a suitable broad band laser medium 24, a polarizing element 25, a Faraday rotator 26, a first mirror 27, and an output mirror 28. Laser energy from the laser medium 24 is directed along an optical axis 29. This laser energy is linearly polarized by polarizing element 25. The linearly polarized energy then passes through the Faraday rotator 26, where the polarization angle of the linearly polarized energy is rotated by a prescribed amount. This energy then reflects off of the mirror 27 and is directed back through the Faraday rotator 26 along the optical axis 29, where it is again rotated the prescribed amount. The polarization element 25 is configured to only allow optical energy having one of a plurality of prescribed polarization angles to pass therethrough without attenuation. Hence, only optical energy rotated by the Faraday rotator so as to have one of the prescribed polarization angles of the polarization element 25 is allowed to pass back through the polarization element to the lasing medium 24. This polarized energy reinforces the lasing action of the medium 24 as it passes therethrough, and continues along the optical axis 29 to the output mirror 28. At the output mirror 28, a portion of the energy is transmitted as the output beam 23 of the system, while the remaining portion of the energy is reflected back to the mirror 27, through the medium 24, the polarization element 25, and the Faraday rotator 26, as above described.

The amount of rotation imparted to the linearly polarized laser energy by the Faraday rotator 26, as explained more fully below, varies as a function of (1) the wavelength of the laser energy passing therethrough, and (2) the strength (intensity) of a magnetic field present within with the Faraday rotator. Thus, laser energy having a wavelength $\lambda 1$ may be rotated by an angle $f1$, while laser energy having a wavelength $\lambda 2$ may be rotated by an angle $\theta 2$, for a given strength of magnetic field. Hence, by controlling the strength of the magnetic field, the amount of rotation imparted to the laser energy can be "tuned" so that the requisite angle of rotation required for a particular wavelength to pass through the polarization element 25 is imparted to the laser energy. Only this wavelength is allowed to resonate within the resonant cavity of the laser, and hence only this wavelength is available as the output energy 23 of the laser system. Thus, by adjusting the strength of the magnetic field, the wavelength of the laser output energy 23 can be changed or tuned to a desired wavelength.

Typically, the polarization sensitive element 25 shown in the block diagram of FIG. 2A comprises a beam cube, or equivalent element, that both: (1) linearly polarizes the laser energy to have a polarization angle of $n\pi$, where n is an integer, and (2) filters the laser energy passing therethrough so that only light having a polarization angle of $n\pi$ is allowed to pass therethrough without attenuation. In such an instance, it is thus seen that the Faraday rotator 26 must impart an angle of rotation of $\pi/2$ (90°) for each pass of the laser energy therethrough. However, it is to be understood that the invention is not so limited. That is, the polarization element 25 could, for example, polarize the laser energy to have a polarization angle of $n\pi/4$ or $n\pi/8$ (and correspondingly allow laser energy to pass therethrough only when the energy has a polarization angle of $n\pi/4$ or $n\pi/8$), and the Faraday rotator 26 could be correspondingly configured to impart an angle of rotation to the polarized light of $n\pi/8$ or $n\pi/16$ for each pass through the device. So long as the amount of rotation imparted to the polarized energy for a desired wavelength for two passes through the Faraday rotator 26 (once in each direction) corresponds to an angle of polarization that is allowed to pass through the polarization element 25, then the tuning principles of the present invention may be practiced.

Figure 2B:
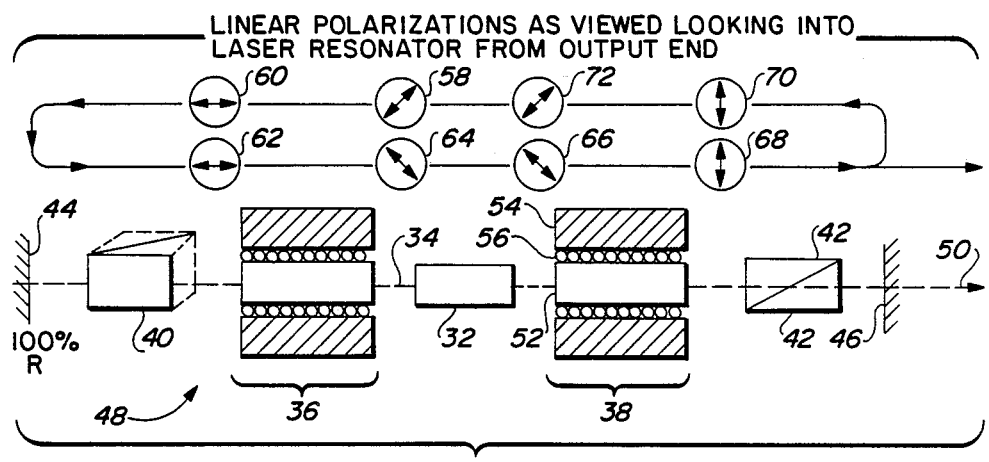
FIG. 2B is an optical schematic block diagram of one embodiment of the tunable laser of the present invention, and includes polarization symbols indicating exemplary polarization angles of the laser radiation oscillating within the laser.

Referring next to FIG. 2B, an optical schematic diagram of a particular embodiment of a tunable laser system 30 made in accordance with the present invention is illustrated. The system includes a laser medium 32 having an optical axis 34. Optically aligned with the optical axis 34, and adjacent one side of the laser medium 32, is a specially constructed Faraday rotator 36. Similarly, adjacent the other side of the laser medium 32, and optically aligned with the optical axis 34 is another specially constructed Faraday rotator 38. A pair of polarizing beam cubes 40 and 42 are placed on the optical axis 34 and positioned next to the Faraday rotators 36 and 38 as shown. A mirror 44 having a 100% reflective surface is aligned perpendicular to the optical axis 34 and placed adjacent the polarizing beam cube 40. Likewise, a mirror 46, also aligned perpendicular to the optical axis 34, is placed adjacent the polarizing beam cube 42. The two optically aligned mirrors 44 and 46 define an optically resonating cavity 48 wherein laser energy directed along the optical axis 34 resonates. The mirror 46 has a partially reflecting surface, allowing a prescribed percentage of the laser radiation incident thereto to be transmitted through the mirror, this transmitted portion of the laser radiation comprises the laser output 50 of the system. Typically, the percentage of radiation transmitted through the mirror 46 is in the range of 5-50%, while the remainder of the radiation is reflected back along the optical axis 34 and is used to maintain the lasing action of the laser medium 32.

Still referring to FIG. 2B, the system 30 utilizes the combination of Faraday rotators 36 and 38 and the polarization beam cubes 40 and 42 (which are, in effect, polarization sensitive loss components) for the purpose of selecting a desired oscillating wavelength for the laser output 50. The laser medium 32 is excited with an appropriate energy, such as a pump laser (not shown in FIG. 2B). This external energy initiates the lasing action of the medium 32, causing a broad band of radiation, e.g. having wavelengths that vary over 100 angstroms, to be emitted along the optical axis 34. Each of the Faraday rotators 36 or 38 cause the angle of polarization to be rotated a prescribed angle $\theta$ as the radiation passes therethrough. Advantageously, as is discussed more fully below, this angle of rotation is a function of the wavelenqth of the radiation oscillating in the cavity 48, as well as other control parameters. Each of the polarization beam cubes 40 or 42 allow radiation having a prescribed angle of polarization to pass therethrough without attenuation. Thus, these beam cubes act as both a polarizing element (to linearly polarize the laser energy so that it has a particular angle of polarization associated therewith) and as a polarizing filter (to only allow linearly polarized light having the prescribed angle of polarization to pass therethrough). Hence, only radiation having the prescribed angle of polarization (that which is allowed to pass through the beam cubes 40 and 42 without attenuation) continues to oscillate in the resonant cavity and is available as the laser output 50. The wavelength of the radiation oscillating in the resonant cavity can be selected by controlling the angle of rotation $\theta$ imparted to that particular wavelength as the radiation passes through the Faraday rotators 36 and 38, so that $\theta = \pi/4$ (45°).

The Faraday rotators 36 and 38 operate on the principle (discovered by Michael Faraday, after whom the rotating devices are named) that when a piece of heavy glass is placed in a magnetic field and a beam of plane polarized light passes through the glass in a direction parallel to the line of magnetic force, the plane of polarization of the beam is rotated. It was subsequently discovered that this rotation of the polarized light (radiation) also occurred with a large number of substances, not just glass. The amount of the rotation was found to depend on the kind of matter and its physical condition, and on the strength of the magnetic field and the wavelength of the polarized light. In general, where $\theta$ represents the angle of rotation of the polarized radiation, this relationship can be expressed as:

$$\theta = vlH\{n - \lambda(dn/d\lambda)\}n^2/\lambda^2$$

where
- $\nu$ = Verdet constant,
- $l$ = length of optically active material,
- $H$ = magnetic field strength (intensity),
- $n$ = refractive index, and
- $\lambda$ = wavelength.

The Verdet constant $\nu$ is a known physical parameter for many substances. Values of the Verdet constant as a function of material and wavelength are published in numerous sources, such as the Smithsonian Physical Tables.

The Faraday rotators 36 and 38 utilized in the embodiment of the invention shown in FIG. 2B will now be described. As these Faraday rotators are identical, the following description will be directed to just the Faraday rotator 38, but it is to be understood that the description also applies to the Faraday rotator 36. As seen in FIG. 2B, the Faraday rotator 38 includes a magneto optically active material 52 optically aligned with the optical axis 34 through which the radiation oscillating in the resonant cavity 48 passes. This magneto optically active material 52 may be referred to hereafter as a transmissive medium 52. The material or medium 52 has a known or discoverable Verdet constant associated therewith. For the embodiment shown in FIG. 2B, this transmissive medium may be, for example, terbium doped glass. Other materials that could be used for the medium 52 include yttrium-iron-garnet, terbium-gallium-garnet, zinc sulfide, and crystal quartz. It is noted that this list of materials is not meant to be limiting, but represents only an example of the types of materials that may be used in the Faraday rotator as the transmissive medium 52. Any substance having a known or discoverable Verdet constant could be utilized for this medium.

A permanent magnet 54, such as a cylindrical magnet, surrounds the medium 52. The magnet 54 has magnetic poles at each end thereof, thereby generating a magnetic field that pervades the medium 52. The magnetic lines of force of the magnetic field pass through the medium 52 in a direction substantially parallel to the optical axis 34. Also surrounding the transmissive medium 52 is an electrical coil 56, the turns of which are shown in cross section in the schematic diagram of FIG. 2. As shown in FIG. 2, this coil is inside of the permanent magnet 54, although it could also be outside of the permanent magnet 54. The windings of the coil 56 are helically wound around the medium 52 in conventional manner. When energized with an electrical current, a magnetic field is generated by the coil 56 according to well known electromagnetic principles. This magnetic field produces lines of magnetic force through the center of the coil, i.e., substantially parallel to the optical axis 34.

The total magnetic field strength present at the medium 52 may be expressed as $H_T = H1 + H2$ where H1 is the magnetic field strength or intensity resulting from the permanent magnet 54 and H2 is the magnetic field strength or intensity resulting from the coil 54. H1 will be a fixed known value based on the material and construction of the permanent magnet 54. H2 will assume a value that is dependent upon the number of turns in the coil, the magnetic permeability of the medium 52, and the amplitude and polarity of the electrical current flowing in the coil 56. This current can be either direct current or alternating current having any desired waveform, such as sinusoidal, trapezoidal, etc. Note that H2 may be either positive or negative at any instant in time depending upon the polarity of the electrical current applied to the coil 56 at that instant in time. Hence, by controlling the polarity and amplitude of the electrical current applied to the coil 56, the total magnetic field intensity $H_T$ may be controlled, at least within a prescribed range.

Typically, the value of H1 will be much greater than the maximum value of H2. This allows strong total magnetic field intensities to be realized without requiring large currents in the coil 56. This is an important consideration because of the heat generated in the coil 56 by the current. Even with H1 much greater than H2, however, the range of values that $H_T$ can assume, which range of values may be expressed as $H_T = H1 \pm H2(\max)$, where H2(max) is the maximum value that H2 assumes with a maximum electrical current flowing through the coil 56, still provides adequate adjustment range for adjusting the rotation angle $\theta$ a sufficient amount to perform the desired tuning function.

To further explain the tunable laser 30 of FIG. 2, an example of its operation will now be presented by following the laser radiation as it travels along the optical axis 34 within the resonant cavity 48. Starting at a point on the optical axis 34 immediate to the left of the output mirror 46, the radiation passes through the beam cube 42 traveling in a right-to-left direction. This radiation, after passing through the beam cube 42, has a polarization angle as represented by the polarization symbol 70 placed above this point on the optical path. This polarization symbol represents the linear polarization as viewed looking into the laser resonator from the output end. As shown, the radiation has a vertical polarization angle at this point of the laser resonator. The beam cube 42 is oriented so that only radiation having a vertical linear polarization can pass therethrough. Still moving in a right-to-left direction, this radiation passes through the Faraday rotator 38. This action induces a rotation of the beam by an angle that varies as a function of the magnetic field within the rotator 38 and the wavelength of the radiation. Preferably, this angle of rotation for a desired wavelength is selected to be $\pi/4$ (45°). Thus, as the radiation exits from the left side of the rotator 38 it has a relative polarization angle as depicted by the polarization symbol 72. This polarization angle is maintained as the radiation passes through the laser medium 32 in the right-to-left direction, as indicated by the symbol 58. As this radiation passes through the Faraday rotator 36, the polarization angle is rotated by $\pi/4$ (45°). Thus, as the radiation exits from the rotator 36 traveling in the right-to-left direction it has assumed a new polarization angle that has been rotated 45° from its previous angle, as represented, by the polarization symbol 60. This polarization angle, as depicted in FIG. 2B, may be considered as a horizontal polarization angle.

The beam cube 40 is oriented to only allow radiation having a horizontal polarization angle to pass therethrough. Radiation of any other polarization angle is absorbed (or deflected away from the desired optical axis) and prevented from passing through the beam cube 40. Hence, the beam cube 40 acts as a radiation filter that passes only radiation having the horizontal polarization angle. Radiation not having this prescribed horizontal polarization angle is rejected. Note that a polarization angle of $n\pi$, where $n = 0, 1, 2, \ldots$, (0°, 180°, 360°, ...) qualifies as a horizontal polarization angle and any radiation having any such horizontal polarization would pass through the beam cube 40.

Once the radiation passes through the beam cube 40 in the right-to-left direction, it is reflected off of the 100% reflective surface of the mirror 44 and passes back through the beam cube 40 in the left-to-right direction along the optical axis 34. The polarization angle of this radiation does not appreciably change when reflected from the mirror 44. Hence, this radiation still maintains a horizontal polarization angle and thus passes through the beam cube 40 in the left-to-right direction, emerging having a polarization angle as represented by the polarization symbol 62. As this radiation continues along the optical axis 34 in the left-to-right direction, it is again rotated an angle $\theta = \pi/4$ (45°) by the Faraday rotator 36, thereby assuming a new polarization angle as represented by the polarization symbol 64. The radiation maintains this polarization angle as it passes through the laser medium 32 in the left-to-right direction, further contributing to the lasing process as it travels through the medium 32.

When the amplified radiation is emitted from the right side of the laser medium 32, and as it enters the left side of the Faraday rotator 38, it thus has a polarization angle as represented by the symbol 66. As it passes through the Faraday rotator 38, it is again rotated by an angle $\theta = \pi/4$ (45°). Hence, as the radiation emerges from the right side of the Faraday rotator 38 it has assumed a new polarization angle, rotated 45° from its previous angle, as represented by the symbol 68. For the orientation shown in FIG. 2B, this polarization angle is a vertical polarization angle. Hence, this radiation (having such a vertical polarization angle) passes through the beam cube 42 in a left-to-right direction and strikes the mirror 46. The mirror 46, as has been indicated, is a partially transmitting mirror. Hence, a portion of the radiation is transmitted through the mirror and exits the system as the laser output 50. However, a significant portion of the radiation (e.g., 50-95%) is reflected back along the optical axis 34 in a right-to-left direction, and the above-described cycle is repeated.

Hence, it is seen that for the embodiment of the invention shown in FIG. 2B the radiation completes a full cycle along the optical axis 34 by passing through each Faraday rotator twice, one in each direction, being rotated a prescribed amount for each pass. This prescribed amount for a desired wavelength is preferably selected to be 45°, thereby imparting a total rotation to the linearly polarized beam of 180° for each cycle through the resonant cavity.

The amount of rotation imparted to the polarized radiation for each pass through the resonant cavity 48 may be selectively adjusted, thereby effectively tuning the wavelength of the radiation that is allowed to resonate within the cavity and that is available as the laser output 50. This tuning results because the beam cubes 40 and 42 only pass radiation having a prescribed polarization angle (e.g., vertical polarization for beam cube 42 and horizontal polarization for beam cube 40), and the amount of rotation imparted to the beams as they pass through the Faraday rotators 36 and 38 is, at least in part, a function of the wavelength. Hence, tuning is achieved by simply adjusting the strength of the magnetic field until radiation of the desired wavelength is rotated the correct amount so as to pass through the beam cubes 40 and 42 without attenuation.

With the Faraday rotators 36 and 38 being configured as described above, the beam cubes 40 and 42 may be any of numerous commercially available polarization beam cubes that are oriented to pass vertical or horizontal linearly polarized radiation as described, and to reject other polarizations (either through absorption or reflection away from the desired optical path). As has been described, a rotation of linearly polarized radiation through an angle of 180° places it in the same polarization plane as it was in prior to the rotation. Hence, where a reference plane of the beam cube is oriented to pass, for example, linearly polarized radiation in a horizontal plane, any rotation of the beam through an angle of $n\pi$, where n is an integer, also allows the beam to pass through the same beam cube.

As was mentioned above in connection with FIG. 2A, it is to be emphasized that while the embodiment of the invention described in connection with FIG. 2B utilizes a pair of Faraday rotators that rotate the polarized radiation through a total angle of 180° for each cycle of the radiation in the cavity 48, and a pair of polarizing beam cubes, one proximate each Faraday rotator, the invention is not so limited. All the invention requires is at least one polarization rotation element (or equivalent device that controllably rotates the polarization angle of polarized radiation passing therethrough by an amount that varies as a function of the wavelength) that is included within the resonant cavity in optical alignment with a source of polarized radiation so that the plane of polarization of the resonating radiation can be controllably adjusted as a function of wavelength. Also required in the resonant cavity is at least one polarization sensitive filter, or equivalent device, that allows only radiation having one or more prescribed angles of polarization to pass unattenuated therethrough. For example, so long as the polarization element rotates the plane of polarization by an angle $\theta$ for each pass of the polarized radiation therethrough, and so long as the polarization sensitive filter passes only polarized radiation having an angle $n\theta$, where n is an integer, the principles of the present invention, particularly as they relate to tuning the wavelength of the radiation that is allowed to resonate within the cavity, may be practiced.

Figure 5:
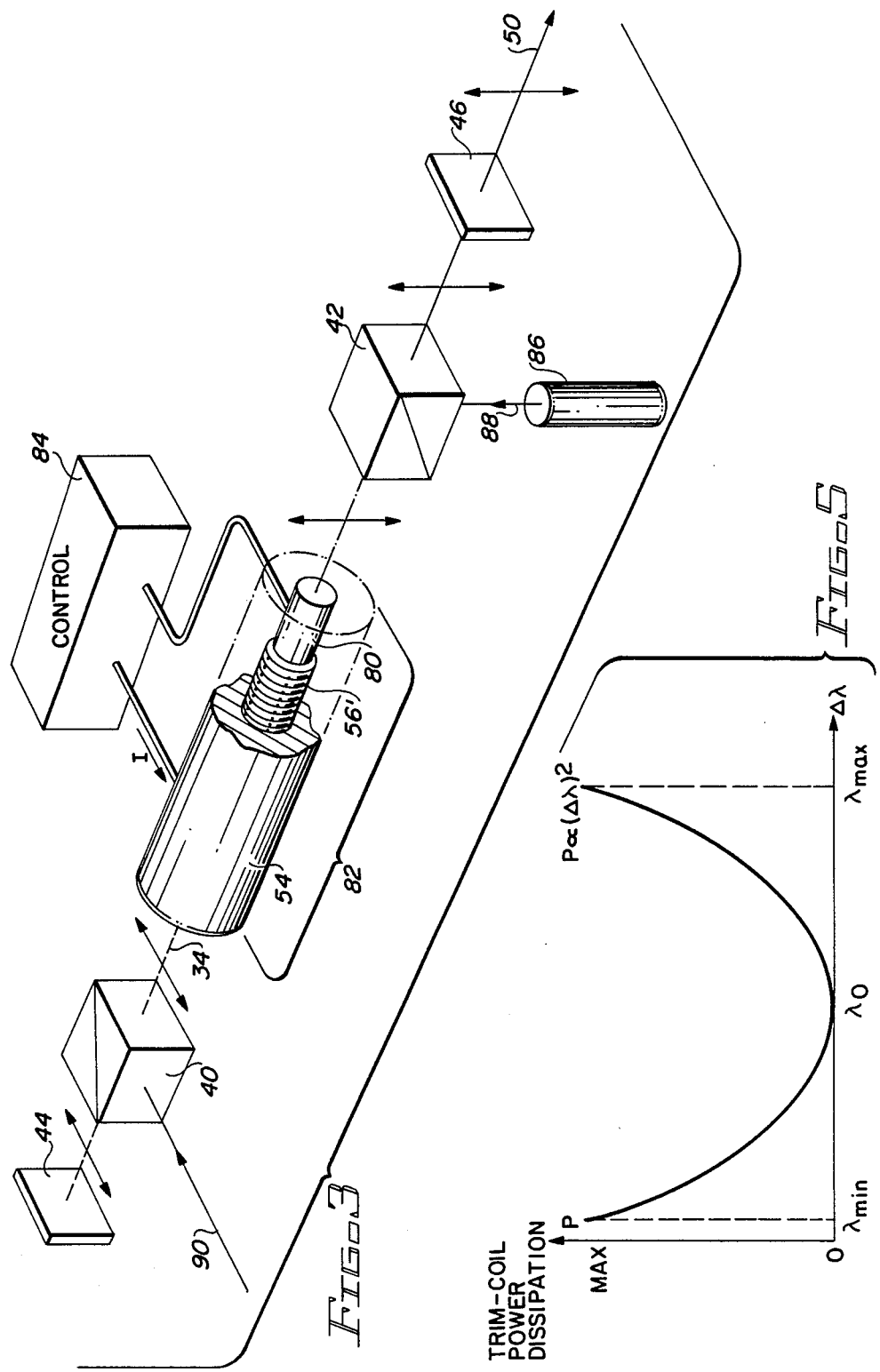
FIG. 5 is a graph that qualitatively illustrates the power dissipation of the trim coil used within the Faraday rotator device as a function of wavelength tuning.

Referring next to FIG. 3, an alternative embodiment of the present invention is schematically and isometrically illustrated. In accordance with this embodiment, the laser medium and the transmissive medium of the Faraday rotator are combined in a single element. This combined medium is identified in FIG. 3 by the reference numeral 80, and the combined Faraday rotator and laser medium is identified as a single Faraday rotator/laser element 82. Other reference numerals used in FIG. 3 remain the same as were used in FIG. 2 for like parts. Hence, as seen in FIG. 3, the medium 80 of the rotator/laser device 82 emits polarized radiation on the optical axis 34. This radiation oscillates in an optical cavity, the end points of which are defined by the mirrors 44 and 46. Further, this radiation passes through beam cubes 40 and 42, the same as in FIG. 2. The plane of polarization of the radiation as it oscillates along the optical axis 34 is indicated at various points along the optical axis as double-headed arrows. FIG. 3 also illustrates a control circuit 84 connected to the coil 56' of the rotator/laser 82. This control circuit 84 generates an electrical current I that flows through the windings of the coil 56'. The amplitude and polarity of this current I are selectively controlled, as desired, in order to generate a magnetic field of a particular intensity. This magnetic field intensity is selected or controlled so as to rotate the plane of polarization of a particular wavelength a sufficient amount so as to allow its passage through the beam cubes 40 and 42. Further, as a practical matter, a means of removing heat from the coil 56' is required to avoid optical distortions in the Faraday rotation/laser device 82. For example, for many applications, a magnetic field strength of about 1K Gauss would be required in order to achieve a 10% wavelength tuning. This dictates a power dissipation, for most typical magneto-rotary materials, of around 100 Watts. Hence, in order to remove heat from the coil 56' due to this level of power dissipation, the coil 56' may be constructed from a suitable conductive tubing, such as electrically insulated copper tubing, and the control circuit 84 may be used to circulate a cooling fluid through the tubing. FIG. 5 illustrates the variation in the power dissipation as a function of $\alpha\lambda$, where $\alpha\lambda$ is the amount the wavelength differs from some selected central wavelength. As can be seen, this variation in power dissipation follows a quadratic function, where the power dissipated is proportional to $(\alpha\lambda)^2$.

The operation of the embodiment of the invention shown in FIG. 3 is the same as that described above in connection with FIG. 2 except that the Faraday rotators 36 and 38 and the laser medium 32 of FIG. 2 have all been combined into the single Faraday rotator/laser element 82 in FIG. 3. A pump source 86 directs appropriate optical energy 88 to the beam cube 42. For radiation received in this direction, the beam cube 42 acts as a mirror positioned at a 45° angle relative to the incident radiation, and reflects this radiation onto the optical axis 34 and into the medium 80 of the rotator/laser 82. An additional pump source 90 may be introduced via the beam cube 40, if desired. This introduced energy serves to start the lasing action of the medium 80, causing linearly polarized radiation to be emitted within the active region of the medium 80. As this polarized radiation passes through the medium 80, it is rotated by an amount determined by its wavelength and the magnetic field strength. As shown in FIG. 3, the required rotation per pass is $\pi/2$ (90°). Advantageously, only one tuning element (the Faraday rotator/laser 82) is required for the embodiment shown in FIG. 3 as opposed to the two tuning elements (Faraday rotators 36 and 38) used for the embodiment of FIG. 2.

Figure 4:
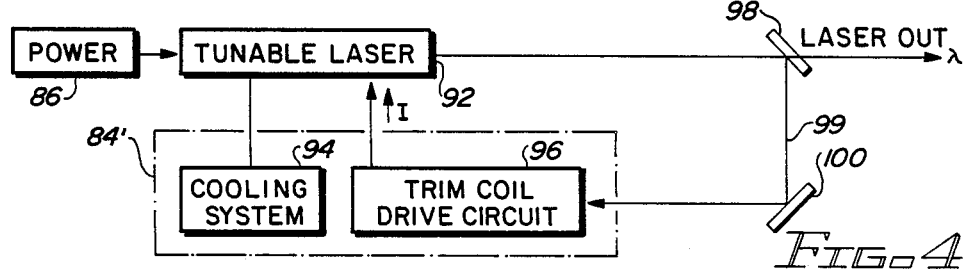
FIG. 4 is a block diagram of a tunable laser system wherein negative feedback is used to automatically maintain the laser wavelength at a desired value.

Referring next to FIG. 4, a block diagram of a tunable laser system in accordance with the present invention is shown. This system includes a tunable laser 92, which may be, for example, the embodiment of the invention shown in FIG. 2 or FIG. 3, providing a laser output 50 having a desired wavelength $\lambda$. Energy from an appropriate power source 86, such as a pump light, is directed to the laser 92. A control circuit 84' controls the operation of the tunable laser 92 by providing the control signals needed for its operation, e.g., by providing a variable electrical current I to the trim coil of its Faraday rotator and by removing heat from the system. The control circuit 84' may thus include a cooling system 94 for the purpose of circulating a cooling fluid through the coil of the Faraday rotator of the laser as explained above; and may further include a trim coil drive circuit 96 for the purpose of generating the electrical current used in controlling the amount of rotation imparted to the polarized radiation resonating within the laser 92. Advantageously, a partially reflecting mirror 98, or equivalent, may direct a small portion of the laser output 50 to the drive circuit 96 by way of an optical path 99 that may include one or more additional mirrors 100. As explained below in connection with FIG. 6, this portion of the laser output is used as a feedback signal to compare the wavelength of the laser output 50 to a desired wavelength. Appropriate corrective action can then be taken, e.g., by adjusting the value of the current I, in order to automatically steer the wavelength of the tunable laser 92 to a desired wavelength.

Figure 6:
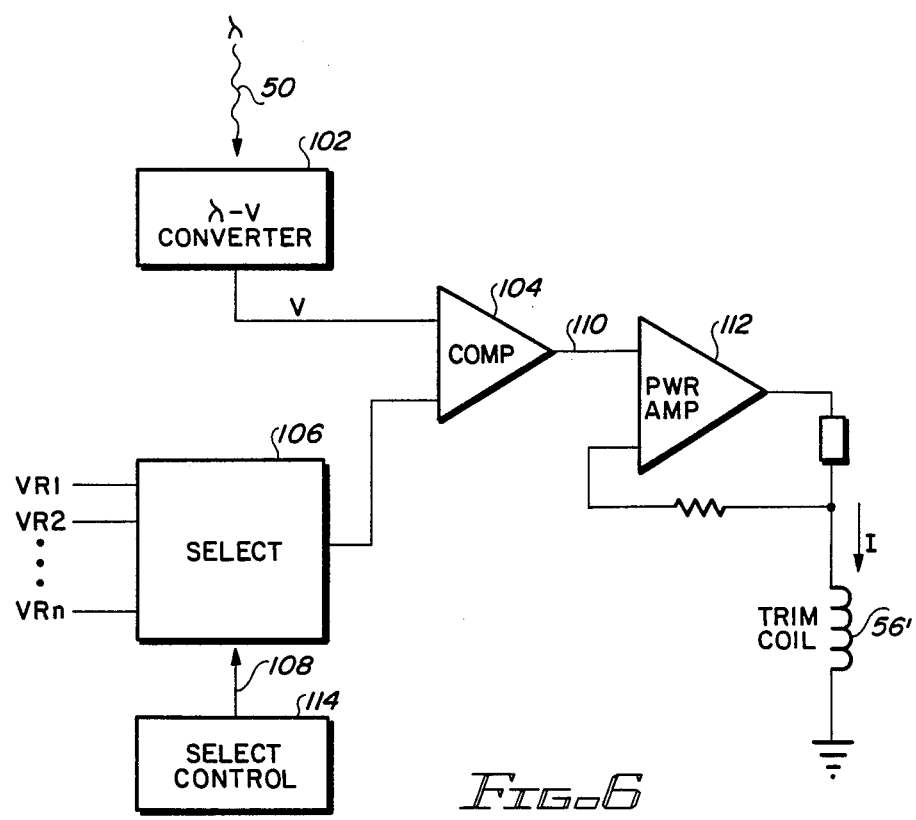
FIG. 6 a schematic diagram of the trim coil drive circuit of FIG. 4.

FIG. 6 shows a block diagram of the trim coil drive circuit 96 of FIG. 4. The laser output 50, having a wavelength $\lambda$ associated therewith, is directed to a wavelength-to-voltage ($\lambda$-V) converter circuit 102. This circuit 102 measures the wavelength of the laser output 50, using conventional means, and generates a voltage proportional to the wavelength measured. This voltage is directed to one input of a comparator circuit 104. The other input to the comparator circuit 104 is a reference voltage, which reference voltage may be a selected one of a plurality of reference voltages, VR1, VR2, ... VRn, selected by a section circuit 106 as dictated by an appropriate control signal 108. Each reference voltage represents a desired wavelength that the tunable laser is to assume. The difference between the selected reference voltage and the measured reference voltage, obtained from the $\lambda$-V converter circuit 102, is thus a representation of the error between the measured wavelength and a desired wavelength. This error is applied as an error signal 110 to the input of a power amplifier 112. The power amplifier 112 generates the drive current I that is connected to the trim coil 56' (FIG. 3) or the coils 56 (FIG. 2). This current I has an amplitude and polarity that vary as a function of the amplitude and polarity of the error signal 110. In this manner, the wavelength $\lambda$ of the output laser 50 can be automatically adjusted to assume a desired value.

Moreover, as is evident from FIG. 6, the control signal 108 that is used to select the desired reference voltage may be generated by an appropriate selection control circuit 114, which circuit 114 may switch the reference voltage between one or more desired reference voltages according to a desired pattern and sequence. Hence, using this arrangement, it is possible for the wavelength $\lambda$of the laser output to be accurately switched between several desired values in accordance with a prescribed sequence.

For example, if the reference values VR1, VR2, ... VRN correspond to wavelengths of $\lambda 1, \lambda 2, ... \lambda N$, respectively, a prescribed sequence of output wavelength's may be: $\lambda 1, \lambda 2, \lambda 1, \lambda 3, \lambda 1, \lambda 4$. This sequence could then be repeated a desired number of times, with the duration during which each output wavelength is provided also being controlled in a desired o fashion. That is, the wavelength $\lambda 1$ may be output for a time T1, the wavelength $\lambda 2$ for a time of T2, and so on.

In one embodiment, the select control circuit 114 may be a suitable microprocessor, or equivalent computer device, that is readily configured or programmed to generate any desired sequence of wavelength selections. In a further embodiment, the $\lambda$-v converter 102 may include an analog-to-digital converter for converting the signal representing the measured wavelength to a digital signal. The select circuit 106 and the comparator circuit 104 may then be realized with digital circuits, e.g. the same microprocessor used as the select control circuit 114, programmed to provide the comparing and error-signal generating functions.

For applications where the laser system is rapidly switched from one wavelength to another, or for applications where it becomes important to rapidly turn the output laser on and off, the rate or speed at which the tuning process can occur (the "switching speed") becomes important. The switching speed is determined largely by the inductive time constant of the Faraday rotator element of the system, i.e., the inductive time constant associated with the magnet coil and associated power supply drive circuit. As is known to those skilled in the art, where an inductance, L, is driven by a voltage source (power supply), and where the voltage source and coil have a combined resistance of R ohms, the circuit time constant is L/R. The inductance L, in turn, is determined by the expression:

$$L = 4\pi\mu N^2 A / 10^9 l \text{ where}$$

N = number of turns of the coil;
$\mu$ = magnetic permeability of medium near which the coil is wound (i.e., the medium 54 of FIG. 2 or FIG. 3);
A = cross sectional area of coil; and
l = coil length.

For a typical application of a Faraday rotator device, these parameters may assume values on the order of:
N = 15 turns
$\mu$ = 1000
A = 1 cm$^2$
l = 5 cm
R = 1 ohm.

For these values, the time constant may be calculated as $5.6 \times 10^{-4}$ seconds, or approximately 0.5 milliseconds. Hence, for a Faraday tuner with the above listed properties, the wavelength could be changed with a characteristic time of about 1 to 1½ milliseconds. This represents a significant improvement over prior art switching speeds for laser devices.

Figure 7:
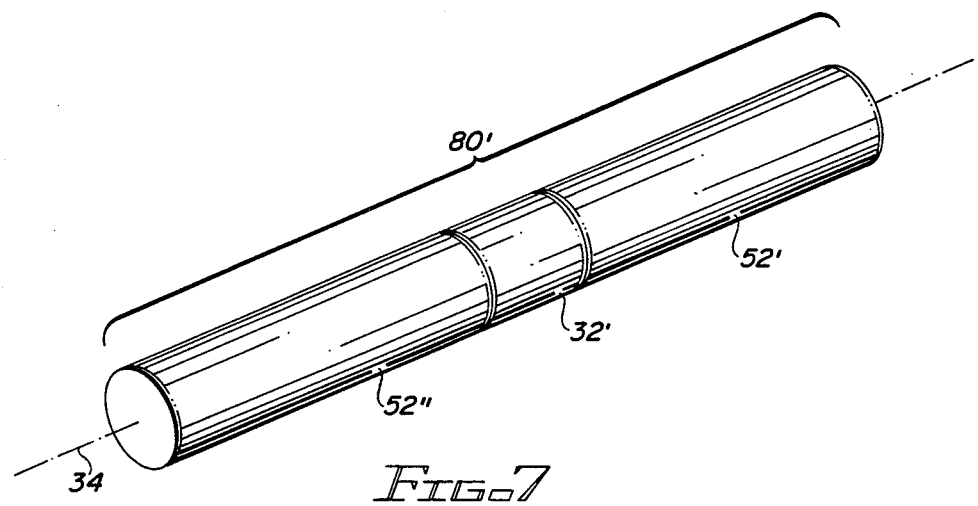
FIG. 7 is a diagram of a hybrid lasing/Faraday-rotation medium.

For the embodiment of the invention shown in FIG. 3, where the Faraday rotator and laser medium are combined in a single element, it is necessary to select a substance for the laser host medium 80 that exhibits the desired lasing properties, and yet also exhibits a sufficiently large Verdet constant. Preferably, for the configuration shown in FIG. 3, the amount of rotation per pass should be $\pi/2$ (90°), thereby allowing just one tuning element 82 to be used for the invention, assuming that conventional beam cubes 40 and 42 are also employed. While numerous substances exhibit sufficiently large Verdet constants at wavelengths of interest (e.g., 0.4-0.7 microns) to allow their efficient use in a tunable laser as herein described, such as selenium, blend (ZnS), quartz, and ziqueline (cuprite), such substances do not exhibit the desired lasing properties. To applicant's knowledge, no single substance is known that exhibits both the needed lasing properties and Verdet constant to allow such single substance to be used as the medium 80. However, it is conceivable that such substance will be discovered, and when it is, it could readily be used as the host medium 80 for the embodiment of the invention shown in FIG. 3. Until such single substance is discovered, a hybrid structure may be used for the medium 80 that includes a suitable lasing host medium, such as Titanium doped sapphire, sandwiched between a suitable Faraday rotation medium, such as terbium doped glass, yttrium-iron-garnet, zinc sulfide, crystal quartz, and the like. Such a hybrid medium is schematically illustrated in FIG. 7 as element 80'. The hybrid medium 80' includes a lasing host medium 32' bonded between suitable Faraday rotation mediums 52' and 52". The bonding is made in a way that not only physically bonds the elements together, but that also maintains the integrity of the optical axis 34 In addition to the materials identified above that exhibit a sufficiently large Verdet constant, it is known that various high-refractive optical glasses may be obtained commercially that also provide favorable Verdet constants for the Faraday effect. Such glasses or other materials may thus be physically and optically bonded to a suitable laser host medium 32' in order to create an appropriate hybrid medium 80 that provides, in combination, the requisite lasing action and Faraday rotation.

As described above, it is thus seen that a versatile tunable laser system is provided that produces a desired output wavelength from a broad band of possible wavelengths. Advantageously, tuning is accomplished using electromagnetic means having no moving mechanical parts, thereby allowing the tuning to be achieved quickly. Further, with no moving mechanical parts, the complexity and maintenance requirements of the system are greatly simplified. Moreover, rapid tuning of the output wavelength allows a laser system wherein the output wavelength can be quickly and accurately switched between a plurality of desired wavelengths, each of which wavelengths can be tuned, either manually or automatically, using the electromagnetic tuning means described above.

The tunable laser herein described may be utilized for a wide variety of applications. These applications include, but are not limited to, frequency modulated information systems, speckle-free imaging, and (when used with dispersive elements external to the laser cavity), non-mechanical beam steering.

While the invention herein disclosed has been described by means of specific embodiments and applications thereof, numerous modifications and variations could be made thereto by those skilled in the art without departing from the scope of the invention. Particular features of the invention are emphasized in the claims that follow.

What is claimed is:

1. A tunable laser comprising:
   a laser medium, including means for exciting said laser medium with sufficient energy to produce a broad band of laser energy;
   means for linearly polarizing said wave of laser energy;
   a resonant cavity wherein said wave of polarized laser energy resonates between specified points;
   at least one adjustable Faraday rotation device withins aid resonant cavity, said Faraday rotation device having a magneto optically active material aligned to have said resonating wave of polarized laser energy pass therethrough, said rotation device further having means for generating a magnetic field having an adjustable intensity, said magnetic field causing the angle of polarization of the polarized wave passing therethrough to be rotated by an amount proportional to the wavelength of the laser energy and the intensity of the magnetic field; and
   a polarization sensitive attenuator within said resonant cavity, said attenuator allowing only linearly polarized waves of a prescribed polarization angle to pass therethrough without attenuation;
   the wavelength of the resonating wave of polarized laser energy that continues to resonate within said resonant cavity without attenuation being tunable to a desired wavelength by selectively adjusting the intensity of the magnetic field within said rotating device.

2. The tunable laser of claim 1 wherein said polarization sensitive attenuator comprises said means for linearly polarizing said wave of laser energy.

3. The tunable laser as set forth in claim 1 wherein said Faraday rotation device comprises:
a permanent magnet having a first magnetic field;
a trim coil positioned within said first magnetic field, said trim coil causing a second magnetic field to be generated when an electrical current passes therethrough;
said magneto optically active material being positioned within said trim coil so as to be pervaded b the magnetic field of said Faraday rotation device;
the total magnetic field of said Faraday rotation device comprising the sum of said first and second magnetic fields, said magnetic field having lines of force that are substantially parallel to the resonating wave of polarized laser energy passing through said magneto optically active material, the intensity of said magnetic field being controlled by controlling the electrical current that passes through said trim coil.

4. The tunable laser as set forth in claim 3 wherein said permanent magnet comprises a cylindrical permanent magnet, and wherein said trim coil is positioned within said cylindrical magnet, said trim coil comprising a plurality of turns of an electrically insulated electrical conductor that are helically wound around said magneto optically active material.

5. The tunable laser as set forth in claim 4 wherein said electrical conductor comprises a conductive tube, and wherein said tunable laser further includes means for circulating a cooling fluid through said conductive tube, whereby heat generated in said trim coil by the electrical current can be transferred away from said coil by said fluid.

6. The tunable laser as set forth in claim 3 further including
means for measuring the wavelength of the laser beam resonating within said resonant cavity and comparing this measured wavelength to a reference wavelength; and
means responsive to said wavelength measuring and comparing means for automatically adjusting the magnitude of the electrical current applied to said trim coil in a direction that forces the wavelength of the laser beam resonating in said resonant cavity to assume a value specified by said reference wavelength.

7. The tunable laser as set forth in claim 6 further including means for selectively comparing the measured wavelength to one of a plurality of reference wavelengths, whereby the wavelength of the laser beam assumes the value of the selected reference wavelength.

8. The tunable laser as set forth in claim 7 wherein said means for selectively comparing includes means for selecting a prescribed sequence of said plurality of reference wavelengths, whereby the wavelength of the laser beam switches its wavelength as defined by said prescribed sequence.

9. A tunable laser comprising:
means for producing a broad band of linearly polarized laser energy;
a resonant cavity wherein said wave of polarized laser energy resonates between specified points;
at least one adjustable Faraday rotation device within said resonant cavity, said Faraday rotation device having a magneto optically active material aligned to have said resonating wave of polarized laser energy pass therethrough, said rotation device further having means for generating a magnetic field having an adjustable intensity, said magnetic field causing the angle of polarization of the polarized wave passing therethrough to be rotated by an amount proportional to the wavelength of the laser energy and the intensity of the magnetic field; and
means for allowing only linearly polarized waves of a prescribed polarization angle to continue to resonate within said resonant cavity;
the wavelength of the resonating wave of polarized laser energy that continues to resonate within said resonant cavity being tunable to a desired wavelength by selectively adjusting the intensity of the magnetic field within said rotating device.

10. The tunable laser as set forth in claim 9 wherein said Faraday rotation device comprises:
a permanent magnet having a first magnetic field;
a trim coil positioned within said first magnetic field, said trim coil causing a second magnetic field to be generated when an electrical current passes therethrough;
said magneto optically active material being positioned within said trim coil so as to be pervaded by the magnetic field of said Faraday rotation device;
the total magnetic field of said Faraday rotation device comprising the sum of said first and second magnetic fields, said magnetic field having lines of force that are substantially parallel to the resonating wave of polarized laser energy passing through said magneto optically active material, the intensity of said magnetic field being controlled by controlling the electrical current that passes through said trim coil.

11. The tunable laser as set forth in claim 10 further including
means for measuring the wavelength of the laser beam resonating within said resonant cavity and comparing this measured wavelength to a reference wavelength; and
means responsive to said wavelength measuring and comparing means for automatically adjusting the magnitude of the electrical current applied to said trim coil in a direction that forces the wavelength of the laser beam resonating in said resonant cavity to assume a value specified by said reference wavelength.

12. The tunable laser as set forth in claim 11 wherein said permanent magnet comprises a cylindrical permanent magnet, and wherein said trim coil is positioned within said cylindrical magnet, said trim coil comprising a plurality of turns of an electrically insulated electrical conductor that are helically wound around said magneto optically active material.

13. The tunable laser as set forth in claim 12 further including means for selectively comparing the measured wavelength to one of a plurality of reference wavelengths, whereby the wavelength of the laser beam assumes the value of the selected reference wavelength.

14. The tunable laser as set forth in claim 10 wherein said laser medium and magneto optically active material comprise a single medium placed within said trim coil.

15. A tunable laser comprising:
laser means for generating a broad band of polarized laser energy, said band of laser energy including polarized waves, each having a wavelength and polarization angle associated therewith;

resonator means in optical alignment with said laser means for receiving said polarized waves of laser energy and reflecting said energy between prescribed points of an optical path;

rotating means for selectively rotating the polarization angle associated with each of said wavelengths by an amount proportional to its wavelength for each pass of said polarized wave between said prescribed points of said optical path; and attenuation means in optical alignment with said optical path for attenuating all wavelengths within said polarized wave of laser energy except those having a prescribed angle of polarization;

whereby only a single wavelength having said prescribed angle of polarization continues to resonate within said resonator means;

the single wavelength that continues to resonate within said resonator means being selectable by adjustment of said rotating means.

16. The tunable laser as set forth in claim 15 wherein said rotating means comprises at least one Faraday rotation device comprising:

a first medium having an optical axis in optical alignment with said optical path, said polarized wave of laser energy thereby passing through said first medium along said optical axis; and means for generating a magnetic field having a variable intensity, said magnetic field having lines of magnetic force that are substantially parallel to said optical axis;

said magnetic field causing the angle of polarization of said polarized wave to be rotated by an amount proportional to the intensity of the magnetic field and said wavelength, whereby the amount of rotation of said polarized wave can be selectively controlled by varying the intensity of said magnetic field.

17. The tunable laser as set forth in claim 16 wherein said means for generating said magnetic field of varying intensity comprises:

a permanent magnet proximate said first medium, said permanent magnet being disposed so as to create lines of magnetic force that are substantially parallel to said optical axis, said lines of magnetic force having a constant intensity associated therewith; and an electrical coil wound about said first medium, said electrical coil when energized with an electrical current causing lines of magnetic force to be generated that are substantially parallel to said optical axis, said lines of magnetic force having an intensity that varies as a function of the amplitude and polarity of the electrical current flowing through said electrical coil;

whereby the intensity of the lines of magnetic force parallel to said optical axis can be selectively controlled within prescribed limits by adjusting the amplitude or polarity of the electrical current flowing through said electrical coil.

18. The tunable laser as set forth in claim 17 wherein said laser means comprises a solid state laser medium having a laser axis in optical alignment with said optical path, and wherein said tunable laser further includes means for exciting said solid state laser medium so as to produce said polarized wave of laser energy.

19. The tunable laser as set forth in claim 18 wherein said solid state laser medium and said first substance of said Faraday rotation device comprise the same element.

20. A method of tuning the wavelength of a laser comprising the steps of:

(a) generating a polarized wave of laser energy having at least one wavelength associated therewith, said polarized wave having a polarization angle;

(b) reflecting said polarized wave of laser energy along an optical path between prescribed points of an optical cavity such that said polarized wave resonates within said cavity;

(c) attenuating all wavelengths within said polarized wave of laser energy passing along said optical path except those having a prescribed angle of polarization;

(d) selectively rotating the polarization angle of said wavelengths by an amount proportional to its wavelength for each pass of said polarized wave between said prescribed points of said optical path for the purpose of selecting or tuning the wavelength of the polarized wave that it is allowed to continue resonating within said cavity without attenuation to a single desired wavelength.

21. The method of laser tuning set forth in claim 20 wherein said laser includes a Faraday rotator device in optical alignment with said optical path, said Faraday rotator having magnet means therein for generating a magnetic field, said magnetic field having lines of force that are substantially parallel to said optical path, said magnetic field causing the angle of polarization of a polarized wave of laser energy passing therethrough to be rotated by an amount determined by the wavelength and the intensity of said magnetic field; and wherein step (d) comprises selectively adjusting the intensity o said magnetic field.

22. The method of laser tuning set forth in claim 21 wherein said Faraday rotator device further includes an electrical coil surrounding said optical path, and wherein the intensity of said magnetic field is adjusted by selectively controlling the amplitude and polarity of an electrical current applied to said coil.

23. A method of tuning a laser system to generate a particular desired wavelength, said laser system including a laser medium, a resonant cavity wherein polarized laser energy from said laser medium may resonate, and means for attenuating all wavelengths associated with said resonating polarized laser energy except those having a prescribed polarization characteristic, said method comprising the steps of:

(a) exciting the laser medium with an appropriate energy so as to generate a plane polarized wave;

(b) optically directing said plane polarized wave to the resonant cavity causing it to resonate therein; and (c) adjusting the polarization orientation of the polarized wave on each pass through the resonant cavity so that only laser energy having said particular desired wavelength continues to resonate in the cavity without attenuation.

24. The method of tuning a laser system as set forth in claim 23 wherein said attenuating means comprises means for passing plane polarized laser energy therethrough only when said plane polarized laser energy has a prescribed angle of polarization, and wherein step (c) includes subjecting said plane polarized wave to an adjustable magnetic field having lines of magnetic force substantially parallel to the direction of travel of said poalrized wave in said resonant cavity, said magnetic field imparting a rotation to the angle of polarization of said polarized laser energy as a function of the intensity of the magnetic field.

25. A method for adjusting the wavelength of a laser beam comprising:
 (a) generating a linearly polarized laser beam;
 (b) resonating said laser beam between end reflectors of an optical cavity;
 (c) rotating the angle of polarization of said laser beam by an amount $\theta$ as said beam passes from one end reflector to the other, the rotation angle $\theta$ having a value dependent upon the particular wavelength of the polarized laser beam;
 (d) attenuating all components of said polarized laser beam for each pass of the laser beam between said end reflectors, except those components having a polarization angle of $\theta n$, where n is any integer, whereby only a laser beam having a polarization angle of $\theta n$ continues to resonate between said end reflectors; and
 (e) adjusting the angle of rotation applied to the polarized laser beam in step (c), as required, to tune the wavelength of the resonating laser beam to a desired wavelength.

26. The method as set forth in claim 25 wherein step (c) comprises subjecting said laser beam to a magnetic field, the magnitude of the rotation angle $\theta$ being a function of the intensity of the magnetic filed and the wavelength of the laser beam.

27. The method as set forth in claim 26 wherein the step of subjecting said laser beam to a magnetic field comprises subjecting said laser beam to a first magnetic field and a second magnetic field; said first magnetic field originating from a fixed magnet and having a fixed intensity; said second magnetic field originating from an electromagnet, and having a variable intensity that varies as a function of the polarity and amplitude of an electrical current applied thereto.

28. The method as set forth in claim 27 wherein step (e) comprises adjusting the amplitude and polarity of the electrical current applied to said electromagnet.

* * * * *

UNITED STATES PATENT AND TRADEMARK OFFICE
CERTIFICATE OF CORRECTION

PATENT NO. : 4,975,918

DATED : Dec. 4, 1990

INVENTOR(S) : Morton

It is certified that error appears in the above-identified patent and that said Letters Patent is hereby corrected as shown below:

Column 7, line 16, change "fl" to --⊖1--. Column 13, line 15, change "$\alpha\lambda$" (both occurrences) to --$\Delta\lambda$--. Column 13, line 19, change "$(\alpha\lambda)^2$" to --$(\Delta\lambda)^2$--. Column 14, line 40, change "$\lambda$of" to --$\lambda$ of--. Column 14, line 49, after "desired" delete --o--.

Column 15, line 67, after "34" insert --.--. Column 17, line 12, change "b" to --by--. Column 20, line 36, change "o" to --of--. Column 21, line 2, change "poalrized" to --polarized--.

Signed and Sealed this

Twenty-third Day of June, 1992

Attest:

DOUGLAS B. COMER

Attesting Officer

Acting Commissioner of Patents and Trademarks